United States Patent
Segev et al.

(10) Patent No.: US 12,446,963 B2
(45) Date of Patent: Oct. 21, 2025

(54) AUTOMATIC PROJECTION OF A CARDIAC CHAMBER POSTERIOR WALL ABLATION LINE

(71) Applicant: BIOSENSE WEBSTER (ISRAEL) LTD., Yokneam (IL)

(72) Inventors: Meytal Segev, Haifa (IL); Lior Jankelson, New Yourk, NY (US)

(73) Assignee: BIOSENSE WEBSTER (ISRAEL) LTD., Yokneam (IL)

( * ) Notice: Subject to any disclaimer, the term of this patent is extended or adjusted under 35 U.S.C. 154(b) by 231 days.

(21) Appl. No.: 18/204,098

(22) Filed: May 31, 2023

(65) Prior Publication Data

US 2024/0398477 A1    Dec. 5, 2024

(51) Int. Cl.
*A61B 34/10* (2016.01)
*A61B 34/00* (2016.01)
*G06T 3/60* (2024.01)
*G06T 7/11* (2017.01)

(52) U.S. Cl.
CPC .............. *A61B 34/10* (2016.02); *A61B 34/25* (2016.02); *G06T 3/60* (2013.01); *G06T 7/11* (2017.01); *A61B 2034/105* (2016.02); *A61B 2034/107* (2016.02); *G06T 2207/30048* (2013.01); *G06T 2207/30101* (2013.01)

(58) Field of Classification Search
CPC ... A61B 34/10; A61B 34/25; A61B 2034/105; A61B 2034/107; A61B 2017/00053; A61B 2018/00351; A61B 2018/00357; A61B 2018/00375; A61B 2018/00577; A61B 2034/2051; A61B 2034/2053; A61B 2034/2072; A61B 18/1492; A61B 18/12; A61B 5/257; A61B 5/28; A61B 5/283; A61B 5/318; A61B 5/333; A61B 18/1206; A61B 2018/00613; G06T 3/60; G06T 7/11; G06T 2207/30048; G06T 2207/30101; G06V 10/25; G06V 10/764
See application file for complete search history.

(56) References Cited

U.S. PATENT DOCUMENTS

| | | | |
|---|---|---|---|
| 5,391,199 | A | 2/1995 | Ben-Haim |
| 5,443,489 | A | 8/1995 | Ben-Haim |
| 5,558,091 | A | 9/1996 | Acker et al. |
| 6,172,499 | B1 | 1/2001 | Ashe |

(Continued)

FOREIGN PATENT DOCUMENTS

WO    WO2022182876 A1    9/2022

OTHER PUBLICATIONS

Hoffmann et al. "Randomized study defining the optimum target interlesion distance in ablation index-guided atrial fibrillation ablation". Europace. Oct. 1, 2020;22(10):1480-1486. doi: 10.1093/europace/euaa147. PMID: 32729896.) (Year: 2020).*

(Continued)

*Primary Examiner* — Kee M Tung
*Assistant Examiner* — Xiaoming Wei
(74) *Attorney, Agent, or Firm* — Clayton, McKay & Bailey, PC

(57) ABSTRACT

A method incudes receiving multiple tags along an ablation curve that covers a partial circumference over an inner wall of a cardiac chamber of a heart of patient. Using the tags, the ablation curve is completed to a full circumference over the inner wall to eliminate a conduction gap in the ablation curve.

16 Claims, 4 Drawing Sheets

(56) References Cited

U.S. PATENT DOCUMENTS

| | | |
|---|---|---|
| 6,239,724 B1 | 5/2001 | Doron et al. |
| 6,332,089 B1 | 12/2001 | Acker et al. |
| 6,484,118 B1 | 11/2002 | Govari |
| 6,618,612 B1 | 9/2003 | Acker et al. |
| 6,690,963 B2 | 2/2004 | Ben-Haim et al. |
| 6,788,967 B2 | 9/2004 | Ben-Haim et al. |
| 6,892,091 B1 | 5/2005 | Ben-Haim et al. |
| 7,536,218 B2 | 5/2009 | Govari et al. |
| 7,756,576 B2 | 7/2010 | Levin |
| 7,848,787 B2 | 12/2010 | Osadchy |
| 7,869,865 B2 | 1/2011 | Govari et al. |
| 8,456,182 B2 | 6/2013 | Bar-Tal et al. |
| 9,504,853 B2 | 11/2016 | Sumanaweera |
| 10,354,758 B2 | 7/2019 | Yang |
| 2017/0128128 A1 | 5/2017 | Saba et al. |
| 2020/0060757 A1* | 2/2020 | Ben-Haim ............. A61B 34/10 |
| 2020/0352652 A1 | 11/2020 | Amit et al. |
| 2021/0307836 A1* | 10/2021 | Schwartz ............... A61B 90/37 |
| 2022/0005198 A1* | 1/2022 | Goldberg ............... A61B 5/364 |
| 2022/0036560 A1 | 2/2022 | Amos |
| 2022/0225924 A1 | 7/2022 | Katz et al. |

OTHER PUBLICATIONS

Koch et al. "Automatic planning of atrial fibrillation ablation lines using landmark-constrained nonrigid registration" J Med Imaging (Bellingham). Apr. 2014;1(1):015002. doi: 10.1117/1.JMI.1.1. 015002. Epub May 22, 2014. PMID: 26158027; PMCID: PMC4478762. (Year: 2014).*

Koch et al. "Novel method for comparison of pre-planned ablation lines for treatment of atrial fibrillation using a common reference model," 2013 IEEE 10th International Symposium on Biomedical Imaging, San Francisco, CA, USA, 2013, pp. 33-36, doi: 10.1109/ISBI.2013.6556405 (Year: 2013).*

European Search Report for corresponding EPA No. 24178963.5 dated Oct. 25, 2024.

* cited by examiner

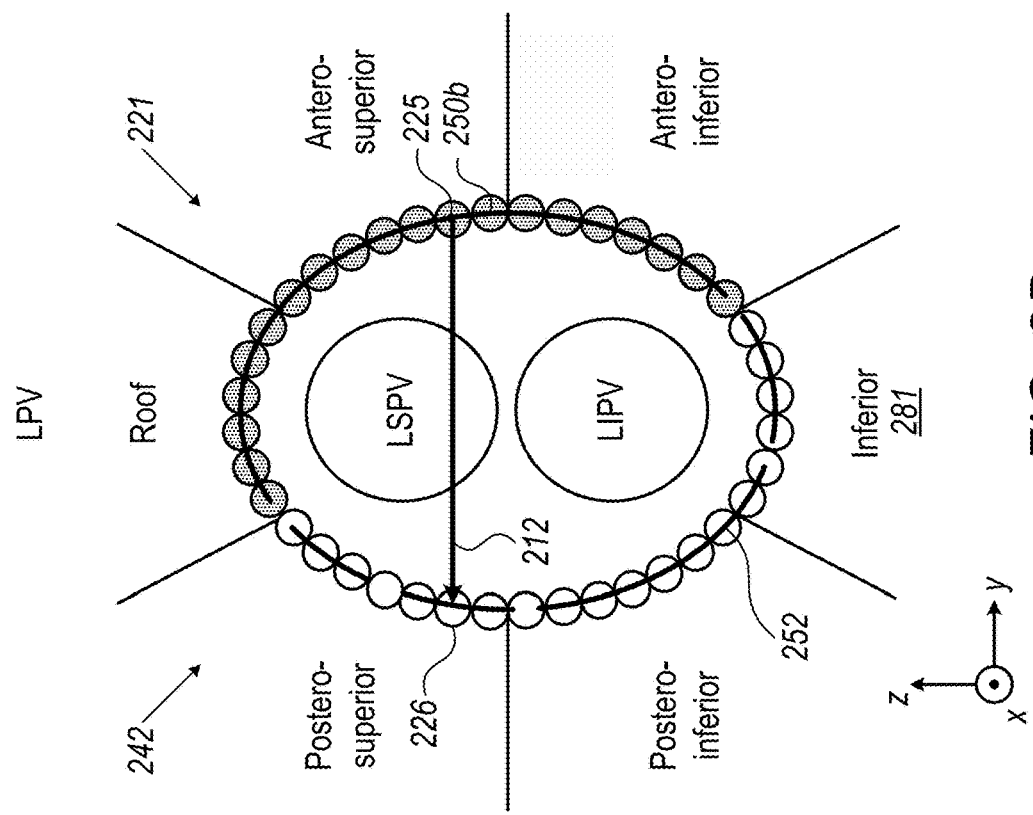
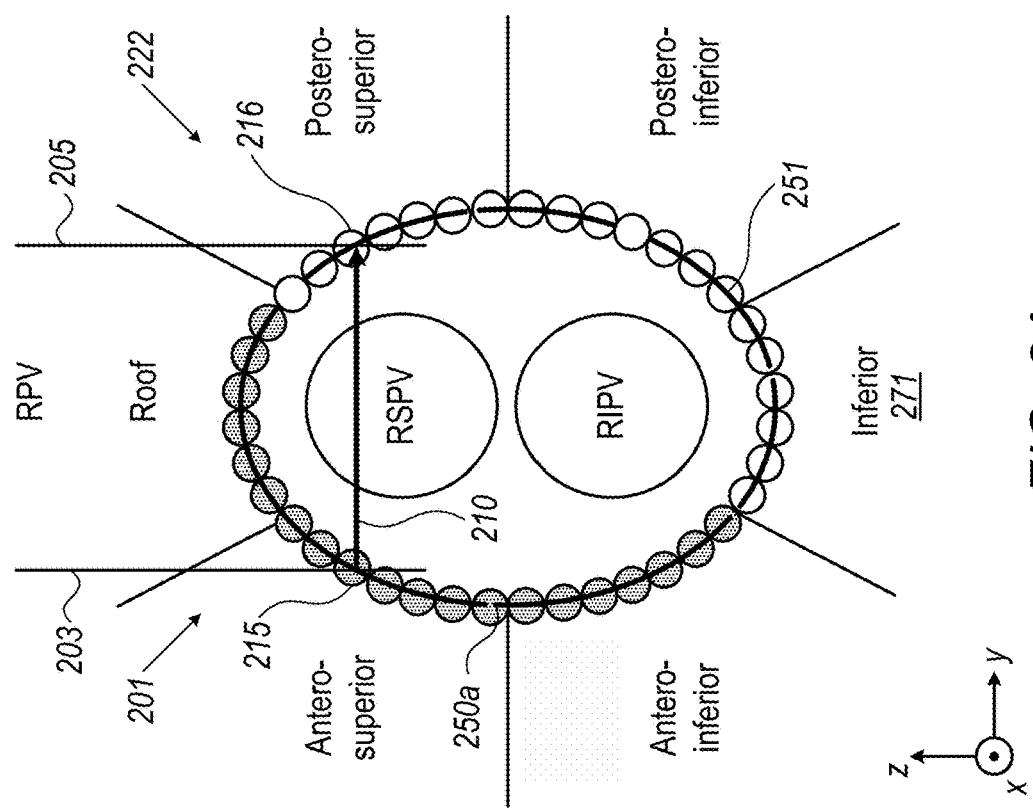
FIG. 2B
FIG. 2A

AUTOMATIC PROJECTION OF A CARDIAC CHAMBER POSTERIOR WALL ABLATION LINE

FIELD OF THE DISCLOSURE

This disclosure relates generally to analysis of electroanatomical (EA) signals, and specifically to a system and method for executing automatic segmentation of anatomical structures of wide area circumferential ablation (WACA) points.

BACKGROUND OF THE DISCLOSURE

Planning methods of cardiac ablation trajectory over an inner wall of a cardiac chamber were previously proposed in the patent literature. For example, U.S. Patent Application Publication 2022/036560 describes a method and apparatus for cardiac tissue segmentation using an evaluation engine implemented using a processor coupled to a memory. The evaluation engine receives effective points respective to cardiac tissue of a patient. The evaluation engine determines an anatomical structural classification for each of the effective points based on a structural segmentation for the cardiac tissue and provides the anatomical structural classification with the each of the plurality of effective points to support treatment of the cardiac tissue.

The present disclosure will be more fully understood from the following detailed description of the examples thereof, taken together with the drawings, in which:

BRIEF DESCRIPTION OF THE DRAWINGS

FIGS. 2A and 2B are schematic illustrations of ablation tags along incomplete ablation lines around right pulmonary vein ostia and around left pulmonary vein ostia, respectively, in accordance with an example of the present disclosure;

DETAILED DESCRIPTION OF EXAMPLES

Overview

Figure 1:
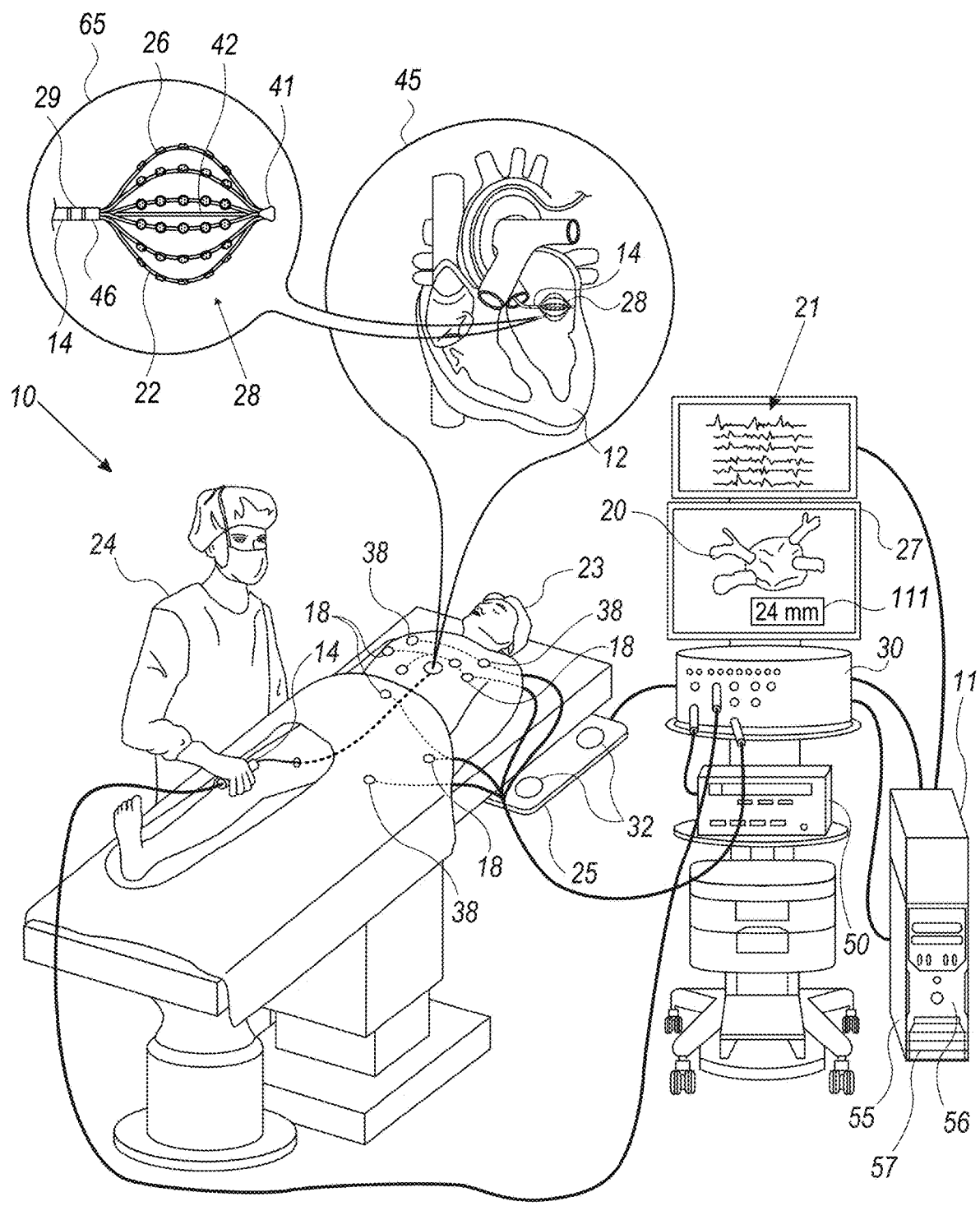
FIG. 1 is a schematic, pictorial illustration of a catheter-based electroanatomical (EA) mapping and ablation system, in accordance with an example of the present disclosure.

Wide Area Circumferential Ablation (WACA) is the standard of care ablation strategy in atrial fibrillation (AFib) cases. Typically, WACA right and left pulmonary vein isolation is performed, point-by-point (the points referred to as WACA ablation points), to create an elliptical (e.g., circular) ring-shaped lesion around the right and left pairs of pulmonary vein ostia.

However, WACA is limited by an existence of potential conduction gaps in WACA ablation lines (also referred to interchangeably herein as ablation curves). These conduction gaps could lead to pulmonary vein reconnection and recurrent arrhythmia.

To overcome these limitations, physicians often attempt to estimate WACA ablation point contiguity. However, during a WACA process, physicians encounter technical challenges in ablating a contiguous line in the anterior wall (relying on anatomical markers), as well as continuing and positioning the ablation line to the posterior wall while ensuring sufficient vein patency.

Examples of the present disclosure that are described herein provide a technique comprising an automated algorithm that uses the anterior ablation tag data to serve as location markers for the anterior ablation lines to compute a complementary posterior design line. This approach aids the user in achieving optimal continuous circumferential ablation. The method relies on the observation that it is easier for a physician to first apply anterior ablation according to the right carina and the left ridge drops.

In an example implementation, a processor receives a region of interest (ROI) on an anatomical map, the ROI comprising left and/or right pulmonary vein ostia and comprising the aforementioned existing anterior ablation tags. In general, each right and left ostia pair has some general orientation in space, such as defined by a normal to a landing plane fitted to the ostia. The processor rotates the ROI such that it is largely parallel to a coronal x-axis of a common sagittal-coronal-axial (yz-xz-xy) x-y-z derived coordinate system.

The processor receives, e.g., e.g., via a user interface such as a graphical user interface (GUI) or a prompt line for entering a numerical value, a user-subjective entry request regarding the desired minimal distance between an anterior ablation tag and a respectively required (e.g., designed) posterior ablation tag. This distance is defined between anterior and posterior planes after rotation into the x-y-z coordinate system. A projection from an anterior tag to a posterior wall location to generate a respective posterior tag is seen in FIGS. 2A and 2B below.

For each ablation tag in the anterior side that intersects the tag position, the processor compares the resulting distance between the two coronal planes. If the resulting distance is larger than, or equal to, the minimal distance, the posterior respective tag is approved. By this computation, the processor aims to avoid sub-optimally located ablation, such as a position too close within the vein ostium, which can result in vein stenosis and further complications, such as incomplete ablation.

Figure 3:
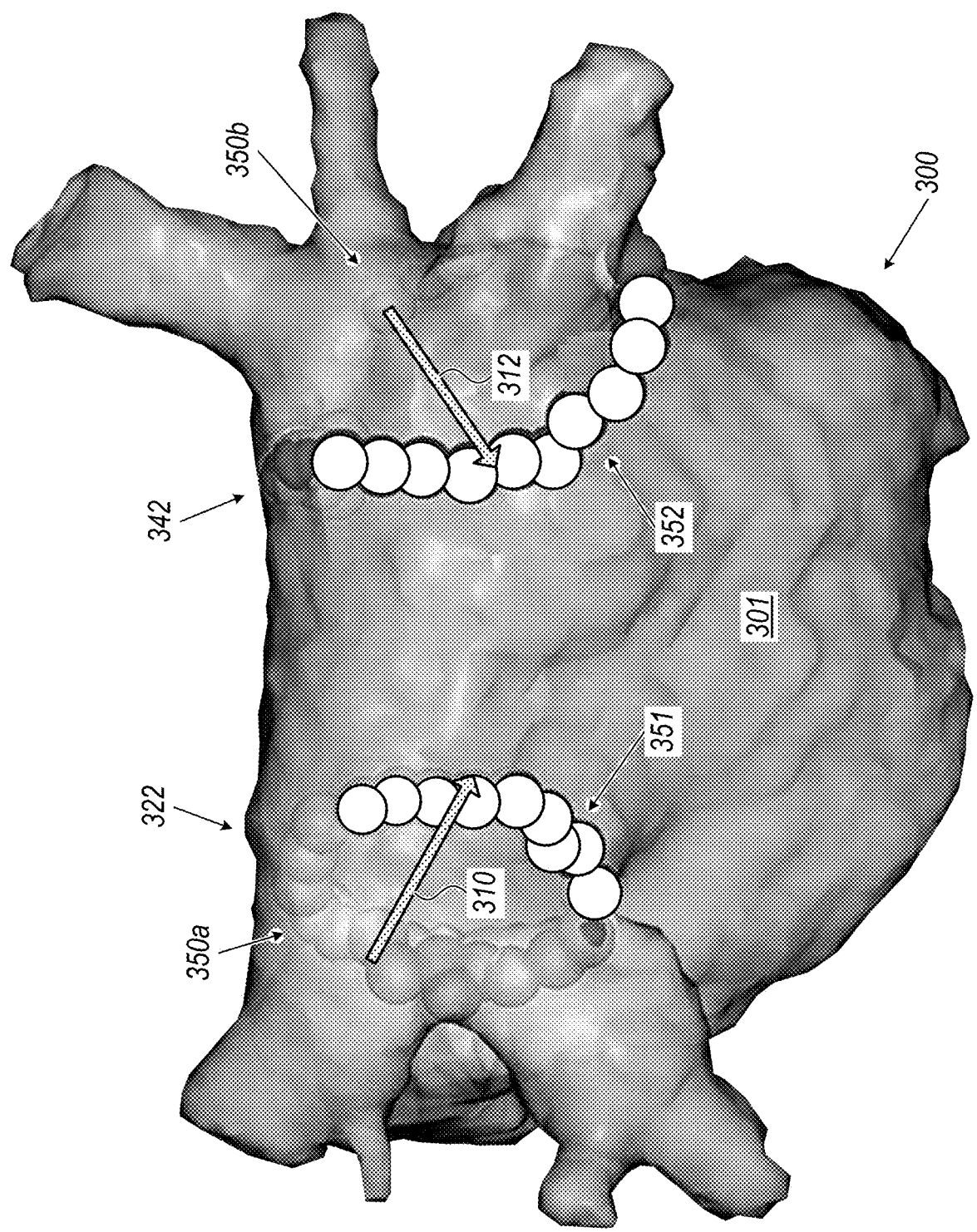
FIG. 3 is an anatomical map of a left atrium and pulmonary veins superimposed with posterior ablation tags projected from respective anterior ablation tags, in accordance with an example of the present disclosure.

The processor adds the required posterior ablation tag to an anatomical map that the physician can view. The anatomical map is provided in the original, non-rotated, coordinate system, and therefore any proposed full ablation line is largely oriented in an oblique angle in space, as seen in FIG. 3 below.

In some examples, the algorithm proposes interpolation of the ablation tags to complete a full WACA contour. The interpolation may be proposed in regions such as the top and bottom portions of the ablation line, where the posterior and anterior lines approach each other and there is no corresponding posterior tag available. In another example, the gap between designed ablation tags over which an interpolation can be made is limited to a maximal value in order to verify that interpolation is relying on a sufficient number, and sufficient density, of posterior ablation tags. The option to perform interpolation may be available, for example, as a check box in the GUI.

As the physician is ultimately responsible to fully make a WACA design without conduction gaps, the physician may, alternatively or additionally to using interpolation, mark any ablation tags deemed missing after the automated WACA planning.

System Description

FIG. 1 is a schematic, pictorial illustration of a catheter-based electroanatomical (EA) mapping and ablation system 10, in accordance with an example of the present disclosure.

System 10 includes multiple catheters which are percutaneously inserted by physician 24 through the patient's vascular system into a chamber or vascular structure of a heart 12 (seen in inset 45). Typically, a delivery sheath catheter is inserted into a cardiac chamber, such as the left or right atrium near a desired location in heart 12. Thereafter, a plurality of catheters can be inserted into the delivery sheath catheter so as to arrive at the desired location. The plurality of catheters may include a catheter dedicated for pacing, a catheter for sensing intracardiac electrogram signals, a catheter dedicated for ablating and/or a catheter dedicated for both EA mapping and ablating. An example catheter 14, illustrated herein, is configured for sensing bipolar electrograms. Physician 24 brings a distal tip 28 (also called hereinafter distal end assembly 28) of catheter 14 into contact with the heart wall for sensing a target site in heart 12. For ablation, physician 24 similarly brings a distal end of an ablation catheter to a target site.

As seen in inset 65, catheter 14 is an exemplary catheter that includes a basket distal end 28, including one, and preferably multiple, electrodes 26 optionally distributed over a plurality of splines 22 at distal tip 28 and configured to sense IEGM signals. Catheter 14 may additionally include a position sensor 29 embedded in or near distal tip 28 on a shaft 46 of catheter 14, for tracking its position and orientation of distal tip 28. Optionally, and preferably, position sensor 29 is a magnetic-based position sensor including three magnetic coils for sensing three-dimensional (3D) position and orientation. As seen, distal tip 28 further includes an expansion/collapse rod 42 of expandable assembly 28 that is mechanically connected to basket assembly 28 at a distal edge 41 of assembly 28.

Magnetic based position sensor 29 may be operated together with a location pad 25 that includes a plurality of magnetic coils 32 configured to generate magnetic fields in a predefined working volume. Real-time position of distal tip 28 of catheter 14 may be tracked based on magnetic fields generated with location pad 25 and sensed by magnetic based position sensor 29. Details of the magnetic based position sensing technology are described in U.S. Pat. Nos. 5,5391, 199; 5,443,489; 5,558,091; 6,172,499; 6,239,724; 6,332,089; 6,484,118; 6,618,612; 6,690,963; 6,788,967; 6,892,091.

System 10 includes one or more electrode patches 38 positioned for skin contact on patient 23 to establish a location reference for location pad 25 as well as impedance-based tracking of electrodes 26. For impedance-based tracking, electrical current is directed toward electrodes 26 and sensed at electrode skin patches 38 so that the location of each electrode can be triangulated via electrode patches 38. Details of the impedance-based location tracking technology are described in U.S. Pat. Nos. 7,536,218; 7,756,576; 7,848, 787; 7,869,865; and 8,456,182.

A recorder 11 displays cardiac signals 21 (e.g., electrograms acquired at respectively tracked cardiac tissue positions) acquired with body surface ECG electrodes 18 and intracardiac electrograms acquired with electrodes 26 of catheter 14. Recorder 11 may include pacing capability to pace the heart rhythm, and/or may be electrically connected to a standalone pacer.

System 10 may include an ablation energy generator 50 that is adapted to conduct ablative energy to one or more electrodes at a distal tip of a catheter configured for ablation. Energy produced by ablation energy generator 50 may include, but is not limited to, radiofrequency (RF) energy or pulsed-field ablation (PFA) energy, including monopolar or bipolar high-voltage DC pulses, to be used to effect irreversible electroporation (IRE), or combinations thereof.

Patient interface unit (PIU) 30 is an interface configured to establish electrical communication between catheters, electrophysiological equipment, power supply and a workstation 55 to control system 10 operation and receive EA signals from the catheter. Electrophysiological equipment of system 10 may include, for example, multiple catheters, location pad 25, body surface ECG electrodes 18, electrode patches 38, ablation energy generator 50, and recorder 11. Optionally, and preferably, PIU 30 additionally includes processing capability for implementing real-time computations of catheter locations and for performing ECG calculations.

Workstation 55 includes memory 57, a processor 56 unit with memory or storage with appropriate operating software loaded therein, and user interface capability. Workstation 55 may provide multiple functions, optionally including (i) modeling endocardial anatomy in three-dimensions (3D) and rendering the model or anatomical map 20 for display on a display device 27, (ii) displaying on display device 27 activation sequences (or other data) compiled from recorded cardiac signals 21 in representative visual indicia or imagery superimposed on the rendered anatomical map 20, (iii) displaying real-time location and orientation of multiple catheters within the heart chamber, and (iv) displaying sites of interest on display device 27 such as places where ablation energy has been applied. One commercial product embodying elements of system 10 is available as the CARTO™ 3 System, available from Biosense Webster, Inc., 31A Technology Drive, Irvine, CA 92618.

In a disclosed example, processor 56 runs an algorithm that uses the anterior ablation tag data as markers for locations over the anterior ablation lines, and computes a complimentary posterior design line to aid the user in achieving optimal continuous circumferential ablation. To this end processor 56 receives, e.g., via a GUI 111, a user-subjective entry of a minimal distance between anterior and required respective posterior tags and applies the calculations described in FIGS. 2A and 2B.

In some examples, processor 56 typically comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

This configuration of system 10 is shown by way of example, in order to illustrate certain problems that are addressed by examples of the present disclosure and to demonstrate the application of these examples in enhancing the performance of such a system. Examples of the present disclosure, however, are by no means limited to this specific sort of example system, and the principles described herein may similarly be applied to other sorts of medical systems. For example, other multi-electrode catheter types may be used, such as the OCTARAY™ catheter or a flat catheter.

Automatic Projection of a Cardiac Chamber Posterior Wall

As noted above, in one example, the disclosed algorithm defines an ROI on an anatomical map of a left atrium, the ROI comprising a portion of the inner wall of the left atrium, the portion comprising one of left and right ostia of pulmonary veins. In general, the ostia are oriented in some angle in space, the direction defined relative to ostia openings, such as a normal to a landing plane of the ostia. The processor uses an application to rotate the ostia orientation to be largely parallel to the coronal axis (i.e., x-axis). After this rotation in space, the entrance planes to ostia FIGS. 2A and 2B lay within the sagittal y-z plane.

FIGS. 2A and 2B are schematic illustrations of respective ablation tags 215 and 225 along incomplete ablation lines 201 and 221 around right pulmonary vein ostia 222 and around left pulmonary vein ostia 242, respectively, in accordance with an example of the present disclosure. Ablation lines 201 and 221 comprise, respectively, anterior ablation line 250a and 250b portions and a yet-to-be-determined posterior portions of ablation lines 251 and 252.

Anterior ablation tags 215 and 225 are easier to apply based on anatomical landmarks, such as the ridge. The disclosed algorithm finds posterior ablation tags 225 and 226 for respective anterior ablation tags 215 and 225. To this end, the algorithm receives, e.g., via GUI 111, a user-subjective entry request for the desired anatomical distance (210, 212) between an ablation tag on an anterior plane 203 and a respectively required ablation tag on a posterior plane 205.

The aforementioned minimal distance sought between anterior and respective posterior ablation tags is also defined between anterior and posterior coronal planes, such as planes 203 and 205. As a guideline, the system may recommend a default minimal distance of 24 millimeters.

To generate a posterior ablation tag, the algorithm computes the shortest distance between the two planes (e.g., 203 and 205) for each ablation tag in the anterior side that intersects the tag position. The distance must be above or equal the minimal distance entered by the user.

In the event that distance 210 between the anterior and posterior planes 203 and 205 is too short, based on the user's configured value, the algorithm does not generate a posterior tag, and, in order to avoid stenosis, may indicate lack of output to the user.

In some examples, the algorithm proposes interpolation of the ablation tags into a full contour. The interpolation may be performed in limited regions, such as the bottom portions (271, 281) of the ablation line, where a corresponding posterior tag may be determined by the above-described method.

Visualization of Projected Posterior Ablation Tags and/or Line

FIG. 3 is an anatomical map 300 of a left atrium 301 and pulmonary veins superimposed with posterior ablation tags 351 and 352 projected from respective anterior ablation tags 350a and 350b, in accordance with an example of the present disclosure.

The map shows typically oblique angled ablation lines, wherein arrows 310 and 312 in space are indicated only to illustrate the process of the projection, whereas actual projections are computed in a rotated coordinate system, as described in FIGS. 2A and 2B.

In addition, some of the ablation tags seen in FIG. 3 may be a result of manual tagging by the physician, while others may be the result of interpolation, as described above.

Figure 4:
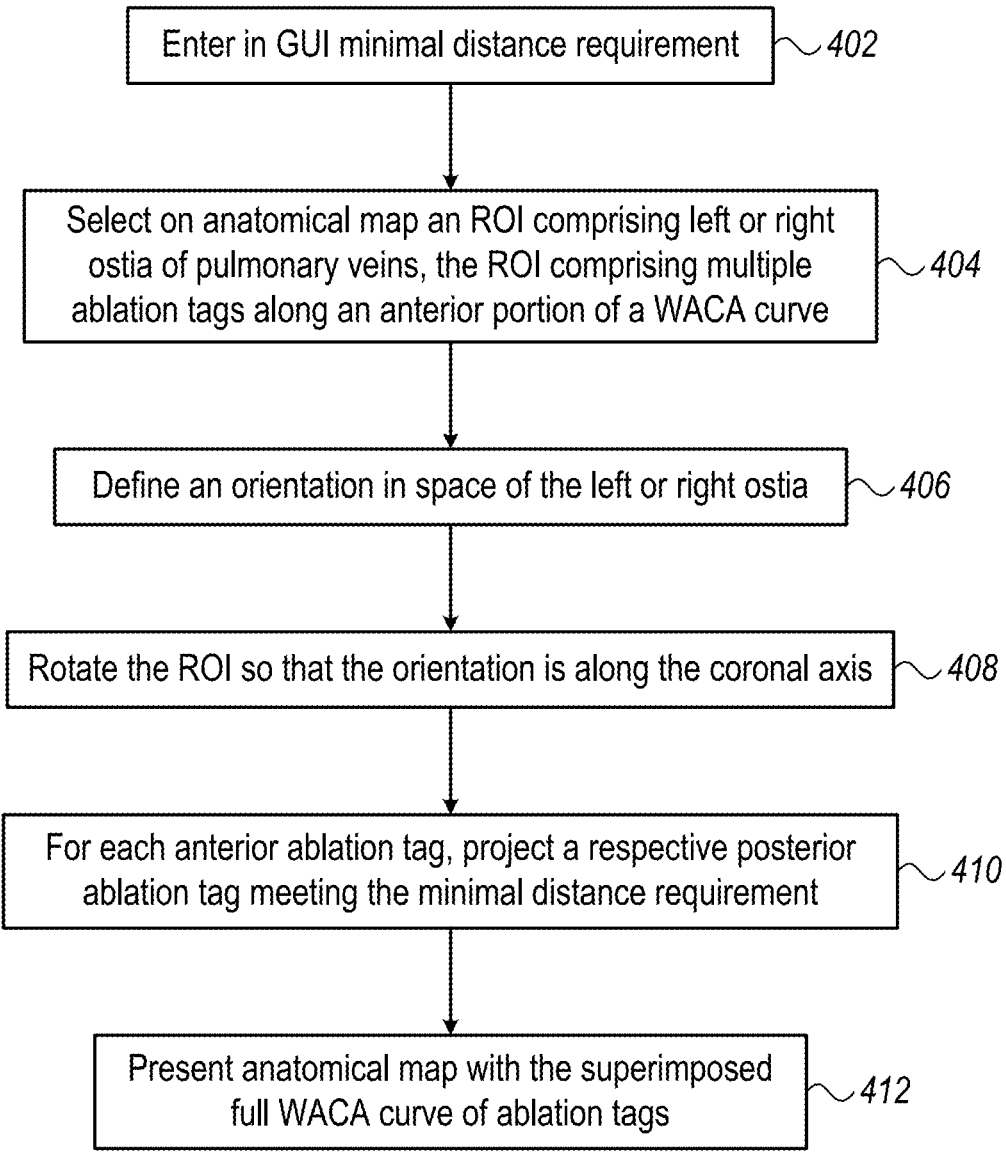
FIG. 4 is a flow chart that schematically illustrates a method to automatically project, from anterior ablation tags, respective posterior ablation tags, in accordance with an example of the present disclosure.

Method of Automatic Projection of a Cardiac Chamber Posterior Wall Ablation Line FIG. 4 is a flow chart that schematically illustrates a method to automatically project, from anterior ablation tags, respective posterior ablation tags, in accordance with an example of the present disclosure. The algorithm, according to the presented example, carries out a process that begins with physician 24 entering a minimal distance between anterior and posterior ablation tags via GUI 111, at a distance requirement setting step 402.

Next, the algorithm, which the physician may initiate via the same GUI or another GUI of the mapping and ablation system, selects an ROI on an anatomical map of the left atrium, at an ROI selection step 404. The ROI is of a map portion of the inner wall of a left atrium related structures and must comprise the aforementioned anterior ablation tags of the right and or left WACA.

The processor uses the algorithm to define, at an orientation defining step 406, an orientation for the selected ROI, which is usually the normal to a landing plane of the right/left ostia included in the ROI. However, the anatomical mapping software applications may include other tools to delineate (and subsequently rotate) an anatomical map or portion thereof in space.

At ROI rotation step 408, the processor runs the algorithm (or another software tool) to rotate the ROI such that the ostia landing plane is parallel to the sagittal y-z plane seen in FIGS. 2A and 2B (or that the orientation of the normal is parallel to the coronal x-axis as defined above).

At ablation tag projection step 410, the processor finds, wherever it exists, a posterior ablation tag counterpart of an existing anterior ablation tag. To this end, the processor projects the anterior tag along the sagittal y-axis, and finds a wall tissue target distant by at least the minimal distance required in step 402.

Finally, at presenting step 412, the processor presents the resulting anatomical map superimposed with a WACA curve that includes the planed posterior ablation line, as seen in FIG. 3.

The flow chart shown in FIG. 4 is chosen purely for the sake of conceptual clarity. Other examples of the technique may comprise different algorithmic steps, such as using a minimal radius from an anterior tag to find the respective posterior tag, instead of using coordinate system rotation. Possible steps, such as graphical ones, are omitted from the disclosure herein purposely in order to provide a more simplified flow chart.

EXAMPLES

Example 1

A method incudes receiving multiple tags (215, 216) along an ablation curve (250a, 250b) that covers a partial circumference (250a, 250b) over an inner wall of a cardiac chamber of a heart (12) of patient. Using the tags (215, 216), the ablation curve (250a, 250b) is completed to a full circumference (201, 221) over the inner wall to eliminate a conduction gap in the ablation curve (201, 221).

Example 2

The method according to example 1, wherein completing the ablation curve (201, 221) comprises computing, for an existing tag (215, 216), a new tag (225, 226) location while meeting a minimal distance that is required between the new tag (225, 226) and the existing tag (215, 216).

Example 3

The method according to any of examples 1 and 2, wherein computing the new tag (225, 226) comprises defining a region of interest (ROI) on an anatomical map of the inner wall, rotating the ROI so a direction of the ROI in space is along a predefined axis of a coordinate system, and calculating a distance (210, 212) between the existing tag (215, 216) and the new tag (225, 226) along an axis orthogonal to the predefined axis.

Example 4

The method according to any of examples 1 through 3, wherein the ROI comprises a map (300) portion of the inner wall of a left atrium related structures, the portion comprising one of left or right ostia (222, 242) of pulmonary veins, the direction is defined relative to ostia openings, the predefined axis is a cross-section of coronal and axial planes, and the distance (210, 212) is calculated between anterior and posterior coronal planes (203, 205).

Example 5

The method according to any of examples 1 and 2, and comprising overlaying the new tag (225, 226) over an anatomical map (300) of the cardiac chamber.

Example 6

The method according to any of examples 1 and 2, wherein the partial circumference of the ablation curve (201, 221) covers an anterior portion (250*a*, 250*b*) of the inner wall of a left atrium, and wherein completing the ablation curve comprises computing a remaining portion (251, 252) the ablation curve over a posterior portion of the inner wall of the left atrium.

Example 7

The method according to any of examples 1 through 6, wherein the full circumference encircles at least one of the pairs of superior and inferior left pulmonary veins and superior and inferior right pulmonary veins.

Example 8

The method according to example 1, wherein completing the ablation curve (250*a*, 250*b*) comprises generating a Wide Area Circumferential Ablation (WACA) curve.

Example 9

A system includes a user interface (111) and a processor (56). The user interface (111) is configured for receiving multiple tags (215, 216) along an ablation curve (250*a*, 250*b*) that covers a partial circumference (250*a*, 250*b*) over an inner wall of a cardiac chamber of a heart of patient. The processor (56) is configured to, using the tags (215, 216), complete the ablation curve to a full circumference (201, 221) over the inner wall to eliminate a conduction gap in the ablation curve (201, 221).

Although the examples described herein mainly address cardiac diagnostic applications, the methods and systems described herein can also be used in other medical applications.

It will be appreciated that the examples described above are cited by way of example, and that the present disclosure is not limited to what has been particularly shown and described hereinabove. Rather, the scope of the present disclosure includes both combinations and subcombinations of the various features described hereinabove, as well and modifications thereof which would occur to persons skilled in the art upon reading the foregoing description and which are not disclosed in the prior art.

The invention claimed is:

1. A method, comprising:
   receiving multiple tags along an ablation curve that covers a partial circumference over an inner wall of a cardiac chamber of a heart of a patient; and
   using the tags, completing the ablation curve to a full circumference over the inner wall to eliminate a conduction gap in the ablation curve,
   wherein completing the ablation curve comprises computing, for an existing tag on an anterior wall of the cardiac chamber, a new tag location on a posterior wall of the cardiac chamber by:
      defining a plane on an anatomical map of the cardiac chamber associated with the anterior wall; and
      projecting the existing tag along an axis orthogonal to the plane to the posterior wall.

2. The method according to claim 1, wherein computing the new tag location includes satisfying a minimal distance that is required between the new tag location and the existing tag.

3. The method according to claim 2, wherein computing the new tag location further comprises defining a region of interest (ROI) on the anatomical map of the cardiac chamber including the anterior wall, rotating the ROI so a direction of the ROI in space is along a predefined axis of a coordinate system, and calculating a distance between the existing tag and the new tag location.

4. The method according to claim 3, wherein the ROI comprises a map portion of the inner wall of a left atrium related structure, the map portion comprising one of left or right ostia of pulmonary veins, the direction is defined relative to ostia openings, the predefined axis is a cross-section of coronal and axial planes, and the distance is calculated between anterior and posterior coronal planes.

5. The method according to claim 2, further comprising overlaying the new tag location over the anatomical map of the cardiac chamber.

6. The method according to claim 1, wherein the partial circumference of the ablation curve covers an anterior portion of the inner wall of a left atrium, and wherein completing the ablation curve comprises computing a remaining portion of the ablation curve over a posterior portion of the inner wall of the left atrium.

7. The method according to claim 6, wherein the full circumference encircles at least one of the pairs of superior and inferior left pulmonary veins and superior and inferior right pulmonary veins.

8. The method according to claim 1, wherein completing the ablation curve comprises generating a Wide Area Circumferential Ablation (WACA) curve.

9. A system, comprising:
   a user interface configured for receiving multiple tags along an ablation curve that covers a partial circumference over an inner wall of a cardiac chamber of a heart of a patient; and
   a processor, which is configured to, using the tags, complete the ablation curve to a full circumference over the inner wall to eliminate a conduction gap in the ablation curve,
   wherein completing the ablation curve comprises computing, for an existing tag on an anterior wall of the cardiac chamber, a new tag location on a posterior wall of the cardiac chamber by:

defining a plane on an anatomical map of the cardiac chamber associated with the anterior wall; and projecting the existing tag along an axis orthogonal to the plane to the posterior wall.

10. The system according to claim 9, wherein computing the new tag location includes satisfying a minimal distance that is required between the new tag location and the existing tag.

11. The system according to claim 10, wherein the processor is further configured to compute the new tag location by defining a region of interest (ROI) on the anatomical map of the cardiac chamber including the anterior wall, rotating the ROI so a direction of the ROI in space is along a predefined axis of a coordinate system, and calculating a distance between the existing tag and the new location tag.

12. The system according to claim 11, wherein the ROI comprises a map portion of the inner wall of a left atrium related structure, the map portion comprising one of left or right ostia of pulmonary veins, the direction is defined relative to ostia openings, the predefined axis is a cross-section of coronal and axial planes, and the distance is calculated between anterior and posterior coronal planes.

13. The system according to claim 10, wherein the processor is further configured to overlay the new tag location over the anatomical map of the cardiac chamber.

14. The system according to claim 9, wherein the partial circumference of the ablation curve covers an anterior portion of the inner wall of a left atrium, and wherein completing the ablation curve comprises computing a remaining portion of the ablation curve over a posterior portion of the inner wall of the left atrium.

15. The system according to claim 14, wherein the full circumference encircles at least one of the pairs of superior and inferior left pulmonary veins and superior and inferior right pulmonary veins.

16. The system according to claim 9, wherein the processor is configured to complete the ablation curve by generating a Wide Area Circumferential Ablation (WACA) curve.

* * * * *